(12) United States Patent
Wang et al.

(10) Patent No.: US 9,280,201 B2
(45) Date of Patent: Mar. 8, 2016

(54) ELECTRONIC DEVICE AND DIGITAL DISPLAY DEVICE

(71) Applicant: MSTAR SEMICONDUCTOR, INC., Hsinchu County (TW)

(72) Inventors: Shih-Chang Wang, Zhubei (TW); Jung-Tai Lin, Taichung (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 318 days.

(21) Appl. No.: 13/845,733

(22) Filed: Mar. 18, 2013

(65) Prior Publication Data
US 2014/0009383 A1 Jan. 9, 2014

(30) Foreign Application Priority Data
Jul. 9, 2012 (TW) .............................. 101124679 A

(51) Int. Cl.
G06F 3/00 (2006.01)
G06F 1/16 (2006.01)
G06F 1/32 (2006.01)
G06F 3/03 (2006.01)
G09G 5/00 (2006.01)

(52) U.S. Cl.
CPC .............. *G06F 3/005* (2013.01); *G06F 1/1605* (2013.01); *G06F 1/3231* (2013.01); *G06F 3/0304* (2013.01); *G09G 5/00* (2013.01); *G09G 2330/021* (2013.01); *G09G 2354/00* (2013.01); *G09G 2360/144* (2013.01); *Y02B 60/1289* (2013.01)

(58) Field of Classification Search
CPC ................. H04N 21/44213; H04N 21/44218; G06F 3/005; G06F 3/0304; G06F 1/1605; G06F 1/3231; G09G 5/00; G09G 2330/021; G09G 2354/00; G09G 2360/144; Y02B 60/1289

See application file for complete search history.

(56) References Cited

U.S. PATENT DOCUMENTS

| 6,128,003 | A | 10/2000 | Smith et al. | |
|---|---|---|---|---|
| 6,259,486 | B1 * | 7/2001 | Mahvi | 348/553 |
| 6,501,515 | B1 * | 12/2002 | Iwamura | G06F 3/017 345/157 |
| 7,017,057 | B2 * | 3/2006 | Magee et al. | 713/320 |
| 7,411,631 | B1 * | 8/2008 | Joshi et al. | 348/734 |
| 8,629,938 | B2 * | 1/2014 | Wong | 348/553 |
| 2004/0004732 | A1 | 1/2004 | Takeda et al. | |
| 2008/0259031 | A1 * | 10/2008 | Yoshino | 345/158 |
| 2009/0195351 | A1 * | 8/2009 | Takeda et al. | 340/5.1 |
| 2011/0273546 | A1 | 11/2011 | Lin et al. | |
| 2011/0273551 | A1 * | 11/2011 | Yang | G06F 3/017 348/77 |
| 2011/0296353 | A1 * | 12/2011 | Ahmed | G06F 3/017 715/848 |
| 2012/0019684 | A1 * | 1/2012 | Yang | G06F 3/017 348/222.1 |
| 2012/0159330 | A1 * | 6/2012 | Jeong | G06F 3/017 715/716 |
| 2014/0009383 | A1 * | 1/2014 | Wang | G06F 3/005 345/156 |

OTHER PUBLICATIONS

Taiwanese Office Action dated on Aug. 26, 2014.

* cited by examiner

*Primary Examiner* — Lun-Yi Lao
*Assistant Examiner* — Kelly B Hegarty
(74) *Attorney, Agent, or Firm* — WPAT, PC; Justin King

(57) ABSTRACT

An electronic device switching over a turning on, a turning off and a standby mode is disclosed. The electronic device comprises a sensing unit and a host processing unit. The sensing unit senses a frame image and generates a sensing signal in the standby mode. The host processing unit is electrically connected to the sensing unit for receiving the image signal and performing a host function according to the sensing signal.

14 Claims, 2 Drawing Sheets

ELECTRONIC DEVICE AND DIGITAL DISPLAY DEVICE

This application claims the benefit of Taiwan application Serial No. 101124679, filed Jul. 9, 2012, the subject matter of which is incorporated herein by reference.

BACKGROUND OF THE INVENTION

1. Field of the Invention

The invention relates in general to an electronic device and a digital display device, and more particularly to an electronic device with smart detection function and a digital display device.

2. Description of the Related Art

Along with the advance in digital electronic technology, electronic products with camera lens, such as computers or mobile phones with video lens, have been widely used in people's everyday life. It has become a trend to integrate the screen and the video lens into one element. In recent years, the top of the screen of the notebook computer normally has a video lens disposed thereon, such that the user can conveniently perform video conference via the network, and the computer which integrates a computer host and a screen also adopts the same design.

In addition to the shooting and the video function, the camera lens can also be used for performing facial recognition in some electronic products such as the all-in-one PC equipped with facial recognition software and having a video lens on the top of the screen. The user can log on the system by performing facial recognition through the use of the camera lens instead of inputting the password manually.

As the demand for camera lens is increasing, the demand for electronic devices with camera lens also increases.

SUMMARY OF THE INVENTION

The invention is directed to an electronic device capable of sensing a frame image and accordingly performing the host function to save power consumption in the standby mode.

According to one embodiment of the present invention, an electronic device switching over a turning on, a turning off and a standby mode is disclosed. The electronic device comprises a sensing unit and a host processing unit. The sensing unit senses a frame image and generates a sensing signal in the standby mode. The host processing unit is electrically connected to the sensing unit for receiving the image signal and performing a host function according to the sensing signal.

According to another embodiment of the present invention, a digital display device switching over a turning on, a turning off and a standby mode is disclosed. The digital display device comprises a sensing unit and a host processing unit. The sensing unit senses a frame image and generates a sensing signal in the standby mode. The host processing unit is electrically connected to the sensing unit for receiving the image signal and performing a host function according to the sensing signal.

According to an alternate embodiment of the present invention, an electronic device switching over a turning on, a turning off and a standby mode is disclosed. The electronic device comprises a sensing unit, a host processing unit and a network transmission unit. The sensing unit senses the change of a frame image and generates a first signal in the standby mode. The host processing unit is electrically connected to the sensing unit for receiving the first signal and outputting a second signal. The network transmission unit is coupled to the host processing unit for receiving the second signal and outputting a third signal to the user via a network.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
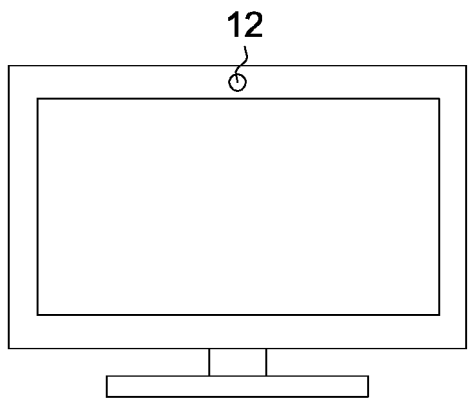
FIG. 1 shows a schematic diagram of an electronic device according to an embodiment of the invention.

Referring to FIG. 1, a schematic diagram of an electronic device 10 according to an embodiment of the invention is shown. The electronic device 10 switches over a turning on, a turning off and a standby mode. The electronic device 10 comprises a sensing unit 12, such as a camera lens, for capturing a frame image. When the electronic device 10 is in the standby mode, the power system (not illustrated) still supplies a standby power. Meanwhile, the sensing unit 12 senses a frame image and generates a sensing signal. In the present embodiment, the electronic device 10 can be realized by such as a computer screen, an all-in-one PC, a tablet PC, a notebook computer or a digital frame. Also, the electronic device 10 can be realized by a digital display device having the sensing unit 12. However, the invention is not limited thereto.

Figure 2:
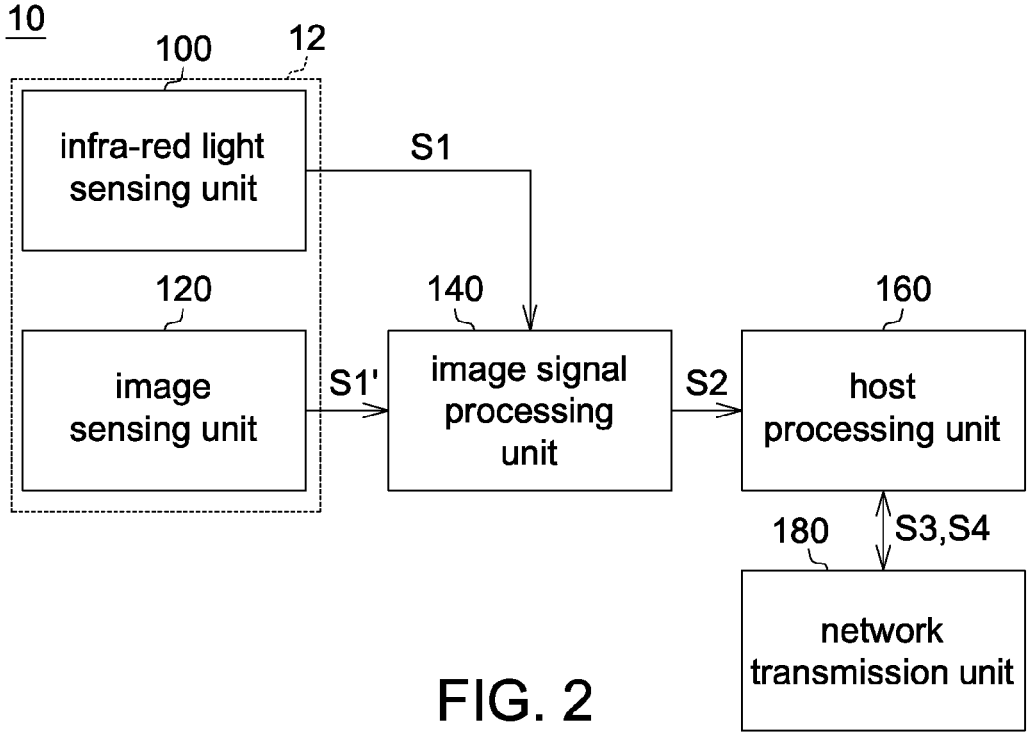
FIG. 2 shows an internal block diagram of an electronic device according to an embodiment of the invention.

Referring to FIG. 2, an internal block diagram of an electronic device 10 according to an embodiment of the invention is shown. As indicated in FIG. 2, the electronic device 10 comprises a sensing unit 12, an image signal processing unit 140, a host processing unit 160 and a network transmission unit 180. The sensing unit 12, such as an infra-red light sensing unit 100 or an image sensing unit 120, senses a frame image within a range in the standby mode. At least one of the infra-red light sensing unit 100 and the image sensing unit 120 must be provided.

In the standby mode, the infra-red light sensing unit 100, such as an infra-red light sensor, detects whether there is a radiation heat source within the range according to the charge phenomenon generated due to temperature change, and correspondingly generates a sensing signal S1. In the standby mode, the image sensing unit 120, such as a charge-coupled device (CCD) or a complementary metal-oxide-semiconductor (CMOS) sensor, receives an external light and further converts the external light into an analog electrical signal. Then, the analog to digital converter (ADC) on the chip converts the analog electrical signal for converting the obtained image signal into a digital signal and outputs the digital signal, and correspondingly generates a sensing signal S1'.

The image signal processing unit 140 determines whether the frame image changes according to the sensing signal S1 or the sensing signal S1'. When it is determined that the frame image changes, this indicates that the sensing unit 12 detects the object wobbling, and the image signal processing unit 140 accordingly outputs an image signal S2 to the host processing unit 160. The host processing unit 160 is a processor having an image processing device and can be realized by such as TV, computer, mobile phone. The host processing unit 160 performs a host function according to the image signal S2. The host function is such as a video recording function, a booting function or a transmission function. In an embodiment, the image signal processing unit 140 can be omitted. That is, the host processing unit 160 can directly perform the host function according to the sensing signal S1 or the sensing signal S1'.

In an embodiment, the image signal processing unit 140 determines whether the frame image changes according to the sensing signal S1 or the sensing signal S1', and the image signal processing unit 140 outputs an image signal S2. The host processing unit 160 activates the shooting or video recording function according to the image signal S2. The electronic device 10 of the present embodiment can be used in household monitoring system. In the standby mode, of the electronic device 10 continues sensing and monitoring an environmental frame image. The frame image is not shot the frame image to save power consumption until the sensing unit 12 detects that the frame image have changed. The change of the frame image indicates that the object is wobbling.

In an embodiment, after the image signal processing unit 140 determines that the frame image changes and outputs an image signal S2 to the host processing unit 160, the host processing unit 160, such as a computer or TV having a display screen, accordingly generates and outputs a frame information S3 to the display screen in a real-time manner. In another embodiment, the host processing unit 160 further comprises a storage unit (such as a memory) for storing the frame information S3. Also, the user can pre-set whether to store the recording file when monitoring and shooting a frame image, so as to save power consumption and the storage space of the memory.

In an embodiment, the electronic device 10 of FIG. 2 further comprises a network transmission unit 180 coupled to the host processing unit 160. Through the network transmission unit 180, the frame information S3 can be transmitted to another electronic device (not illustrated) at a remote end in a real-time manner such that the frame information S3 can be displayed on the remote end electronic device such as a mobile phone, a computer, a monitor screen, a TV or a personal digital assistant with display screen.

In an embodiment, the electronic device 10 can be realized by such as a network TV, wherein the signal supported by the network TV is conformed to the floating and/or fixed Internet protocol (IP). The sensing unit 12 is disposed in the network TV. When the user is not using the electronic device 10 (such as the network TV), that is, when the electronic device 10 is in a standby mode, the electronic device 10 can be pre-set to enter a security mode. Such input setting can be done by the user through a signal input device (not illustrated) such as a remote controller or a keyboard. When the electronic device 10 enters the security mode, the host processing unit 160 can switch the Internet protocol (IP) to the fixed IP for the purpose of security monitoring.

When the electronic device 10 is operated in the security mode and the sensing unit 12 detects that the object is wobbling, a sensing signal S1 or a sensing signal S1' can be generated as the detected frame image changes. After the image signal processing unit 140 receives the sensing signal S1 or the sensing signal S1', the image signal processing unit 140 correspondingly outputs an image signal S2 to the host processing unit 160. After the host processing unit 160 receives the image signal S2, the host processing unit 160 outputs a notification signal S4 to the network transmission unit 180. After the network transmission unit 180 receives the notification signal S4, the network transmission unit 180 outputs and sends a network signal to the user through the network connection function to instantly notify the user that the sensing unit 12 of the electronic device 10 detects the wobbling of the object. Thus, security monitoring can be achieved. In the present embodiment, the image signal processing unit 140 can be omitted. That is, the host processing unit 160 can directly output the notification signal S4 to the network transmission unit 180 according to the sensing signal S1 or the sensing signal S1'.

In an embodiment, when it is determined that the frame image changes, for example, the sensing unit 12 detects that the user's hand gesture is wobbling, the image signal processing unit 140 outputs the image signal S2, and the host processing unit 160 activates the host function according to image signal S2 such as by booting the electronic device 10. Therefore, the user can switch over the standby, the turning on and other basic modes of the electronic device 10 through the user's hand gesture without employing a remote controller.

Figure 3:
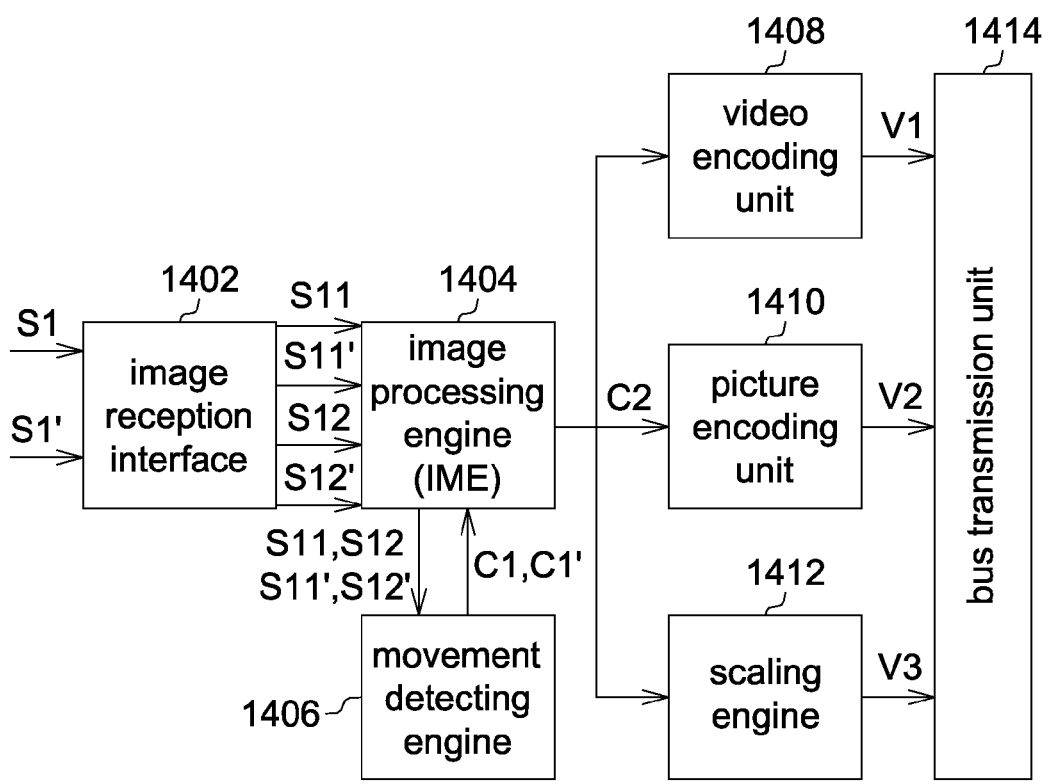
FIG. 3 shows an internal block diagram of an image signal processing unit of FIG. 2.

Referring to FIG. 3, an internal block diagram of an image signal processing unit 140 of FIG. 2 is shown. As indicated in FIG. 3, the image signal processing unit 140 comprises an image reception interface 1402, a movement detecting engine 1406, an image processing engine (IME) 1404, a video encoding unit 1408, a picture encoding unit 1410, a scaling engine 1412 and a bus transmission unit 1414.

In the present embodiment, the image reception interface 1402, such as an image reception port (such as RS485 transmission interface), can receive the sensing signal S1 of the infra-red light sensing unit 100 or the sensing signal S1' of the image sensing unit 120 through the image reception port and/or the RS485 interface.

The sensing signal S1' comprises a first sensing signal S11' and a second sensing signal S12'. For example, the first sensing signal S11' is such as the signal sensed by the image sensing unit 120 at a first time t1, the second sensing signal S12' is such as the signal sensed by the image sensing unit 120 at a second time t2, the first time t1 is smaller than the second time t2, and the first time t1 and the second time t2 are continuous. On the other hand, the sensing signal S1 comprises a first sensing signal S11 and a second sensing signal S12. For example, the first sensing signal S11 is such as the signal sensed by the infra-red light sensing unit 100 at a first time t1, and the second sensing signal S12 is the signal sensed by the infra-red light sensing unit 100 at a second time t2.

Let the sensing signal S1' generated by the image sensing unit 120 be taken for example. The image processing engine 1404 is coupled to the movement detecting engine 1406 for receiving and then outputting the first sensing signal S11' and the second sensing signal S12' outputted from the image reception interface 1402 to the movement detecting engine 1406. The movement detecting engine 1406, such as an adder-subtracter, compares the first sensing signal S11' with the second sensing signal S12' to determine whether there are differences between the two signals and accordingly sends back a comparison result C1' to the image processing engine 1404. The image processing engine 1404 determines whether to activate the shooting function to shoot a frame image according to the comparison result C1'.

In an embodiment, the determination that no differences exist between the first sensing signal S11 and the second sensing signal S12 of the image sensing unit 120 indicates that the frame image within a sensed region does not change within a continuous time. That is, there are no image changes generated in the sensed region. Thus, the image processing engine 1404 is in the standby mode, and there is no need to activate the host function. Conversely, the determination that differences exist between the first sensing signal S11' and the second sensing signal S12' indicates that the frame image within a sensed region changes within a continuous time.

That is, there is a moving object within the sensed region. According to the comparison result, the image processing engine 1404 performs the host function for switching the electronic device to the turning on mode or the shooting mode form the standby mode.

The mechanism of the sensing signal S1 generated by the infra-red light sensing unit 100 is similar to that of the sensing signal S1' generated by the image sensing unit 120 except that the infra-red light sensing unit 100 and the image sensing unit 120 are based on different principles for sensing a moving object. In another embodiment, the image processing engine 1404 also receives and outputs the first sensing signal S11 and the second sensing signal S12 outputted from the image reception interface 1402 to the movement detecting engine 1406. The movement detecting engine 1406 compares the first sensing signal S11 with the second sensing signal S12 to determine whether there are differences between the two signals and sends back a comparison result C1 to the image processing engine 1404. According to the comparison result C1, the image processing engine 1404 determines whether to activate the host function by such as booting or shooting function.

An embodiment in which the shooting function is activated is disclosed below. After the shooting function is activated, the image processing engine 1404 shoots a frame image sensed within a sensed region and outputs an encoding signal C2 to an encoder, realized by such as a video encoding unit 1408 and a picture encoding unit 1410. The video encoding unit 1408 and the picture encoding unit 1410 can encode the shooting result according to the encoding signal C2 and respectively output an image signal V1 and an image information V2. The scaling engine 1412 adjusts the encoding signal C2 according to the host processing unit or the display screen (not illustrated) of another electronic device and outputs an adjusted encoding signal V3, such that the adjusted encoding signal V3 is conformed to the size of the frame window of the display screen. By doing so, when the display screen displays an image, defects such as the jagged edge problem arising due to frame reduction and the sharpness problem arising due to frame enlargement can thus be avoided.

The bus transmission unit 1414, such as a universal serial bus (USB) transmitter, is used for receiving the encoding information V1~V2 and the adjusted encoding signal V3, and further combining the encoding information V1~V2 and the adjusted encoding signal V3 as an image signal S2, and further transmits the image signal S2 to the host processing unit 160 (illustrated in FIG. 1). Then, the host processing unit 160, according to the received image signal S2, performs the host function, such as video recording function, booting function or transmission function.

The image processing of the present embodiment only illustrates an implementation of the invention. For example, reduction/enlargement of the frame window of the display screen and other image processing are performed only when the sensed frame image needs to be displayed on the screen. When the performed host function is simply to activate the booting function or the shooting function, whether to activate the booting or shooting function can be directly determined according to the comparison result C1 without employing complicated image processing.

To summarize, the electronic device of the above embodiments of the invention in the standby mode activates the host function, such as the booting or the shooting or transmission function, only when the sensing unit detects that an object is moving in the sensing region. The movement of the object causes the sensing signal to change. If the host activating function is the booting function, the user would find it more convenient to operate. If the host activating function is the shooting function, the monitor can be integrated in a home electronic appliance for monitoring residential or community safety and further saving power consumption and spatial waste. In an embodiment, the electronic device only stores or transmits the frame information occurring after the sensing signal changes, not only saving power consumption and space but also saving the memory space of the storage component. If the host activating function is the transmission function, the frame can be transmitted to the owner or the manager whenever it is doubted that burglars may have intruded.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
a sensing unit for sensing a frame image and generating a first sensing signal at a first time and a second sensing signal sensed at a second time, wherein the first time is earlier than the second time;
an image reception interface for receiving the first sensing signal and the second sensing signal;
a movement detecting engine for comparing the first sensing signal with the second sensing signal to determine whether there are differences between the first sensing signal and the second sensing signal;
an image processing engine outputting an encoding signal according to a comparison result outputted from the movement detecting engine, indicating that there are differences between the first sensing signal and the second sensing signal;
a video encoding unit for generating an image signal according to the encoding signal;
a picture encoding unit for generating image information according to the encoding signal;
a scaling engine for generating an adjusted encoding signal according to the encoding signal; and
a bus transmission unit for combining the image signal, the image information and the adjusted encoding signal as an image signal;
a host processing unit electrically connected to the sensing unit for performing a host function according to the image signal,
wherein the image processing engine outputs the encoding signal to the video encoding unit, the picture encoding unit and the scaling engine.

2. The electronic device according to claim 1, wherein the host function is a video recording function, a booting function or a transmission function.

3. The electronic device according to claim 1, wherein the host processing unit includes a display screen, and the host processing unit outputs frame information according to the image signal to the display screen to display the frame information.

4. The electronic device according to claim 1, wherein the host processing unit includes a storage unit, and the host processing unit outputs frame information according to the image signal to the storage unit to store the frame information.

5. The electronic device according to claim 1, wherein the host processing unit includes a network transmission unit, and the host processing unit outputs frame information according to the image signal to the network transmission unit to transmit the frame information to another electronic device at a remote end.

6. The electronic device according to claim 1, wherein the host processing unit includes a network transmission unit, and when the electronic device is operated in a security mode, the host processing unit outputs a notification signal according to the image signal to the network transmission unit, the network transmission unit transmit a network signal according to the notification signal to notify a user that the electronic device detects a wobbling of an object.

7. The electronic device according to claim 1, wherein when the electronic device is operated in a security mode, an Internet protocol (IP) of the electronic device is fixed IP.

8. A digital display device, comprising:
- a sensing unit for sensing a frame image and generating a first sensing signal at a first time and a second sensing signal sensed at a second time, wherein the first time is earlier than the second time; and
- an image reception interface for receiving the first sensing signal and the second sensing signal;
- a movement detecting engine for comparing the first sensing signal with the second sensing signal to determine whether there are differences between the first sensing signal and the second sensing signal;
- an image processing engine outputting an encoding signal according to a comparison result outputted from the movement detecting engine, indicating that there are differences between the first sensing signal and the second sensing signal;
- a video encoding unit for generating an image signal according to the encoding signal;
- a picture encoding unit for generating image information according to the encoding signal;
- a scaling engine for generating an adjusted encoding signal according to the encoding signal; and
- a bus transmission unit for combining the image signal, the image information and the adjusted encoding signal as an image signal;
- a host processing unit electrically connected to the sensing unit for performing a host function according to the image signal,
- wherein the image processing engine outputs the encoding signal to the video encoding unit, the picture encoding unit and the scaling engine.

9. The digital display device according to claim 8, wherein the host function is a video recording function, a booting function or a transmission function.

10. The electronic device according to claim 8, wherein the host processing unit includes a display screen, and the host processing unit outputs frame information according to the image signal to the display screen to display the frame information.

11. The electronic device according to claim 8, wherein the host processing unit includes a storage unit, and the host processing unit outputs frame information according to the image signal to the storage unit to store the frame information.

12. The electronic device according to claim 8, wherein the host processing unit includes a network transmission unit, and the host processing unit outputs frame information according to the image signal to the network transmission unit to transmit the frame information to another electronic device at a remote end.

13. The electronic device according to claim 8, wherein the host processing unit includes a network transmission unit, and when the electronic device is operated in a security mode, the host processing unit outputs a notification signal according to the image signal to the network transmission unit, and the network transmission unit transmit a network signal according to the notification signal to notify a user that the electronic device detects a wobbling of an object.

14. The electronic device according to claim 8, wherein when the electronic device is operated in a security mode, an Internet protocol (IP) of the electronic device is fixed IP.

* * * * *